April 26, 1949.  A. E. REIMERS  2,468,409
METHOD OF MANUFACTURE OF ELECTRICALLY HEATED DEVICES
AND ELECTRIC-RESISTANCE-HEATING ELEMENTS THEREFOR
Original Filed Sept. 18, 1940  2 Sheets-Sheet 1
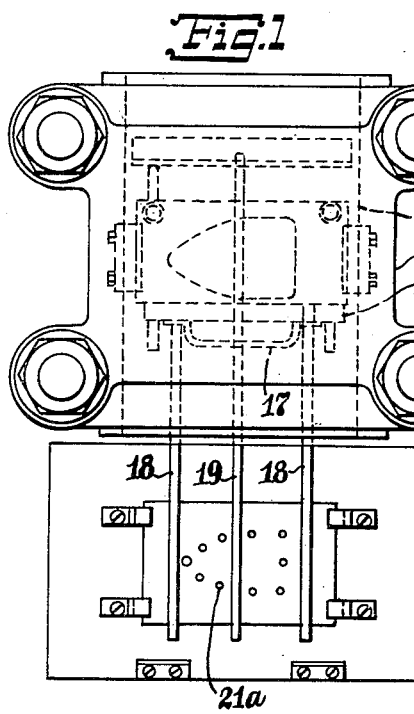
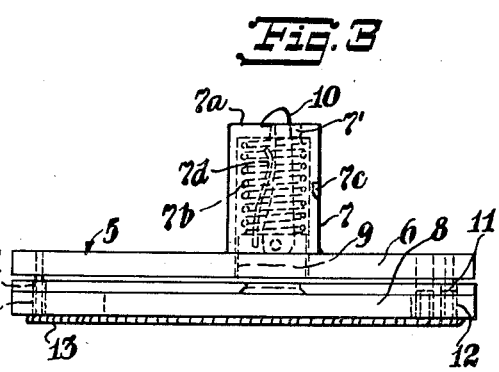
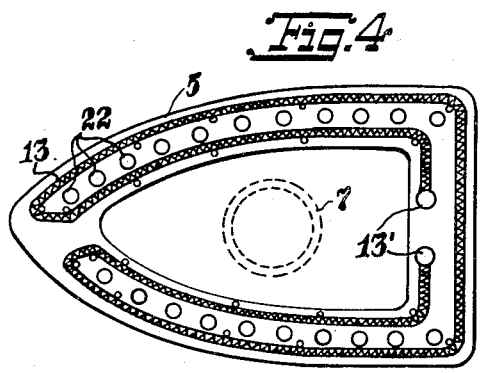
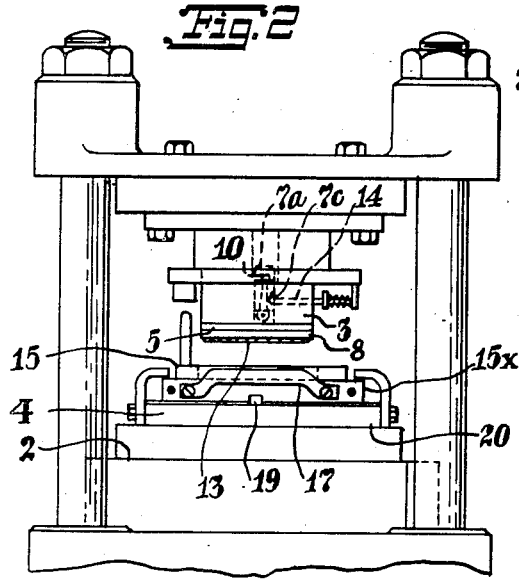
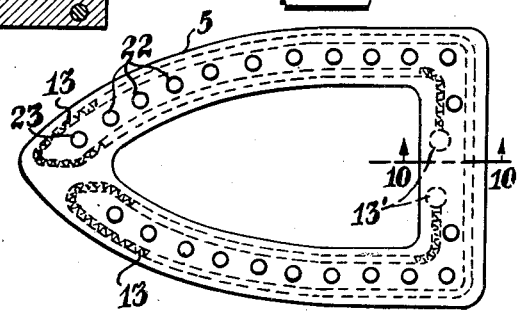
INVENTOR.
ALFRED E. REIMERS
BY
Joseph F. O'Brien
Attorney April 26, 1949.　　　　A. E. REIMERS　　　　2,468,409
METHOD OF MANUFACTURE OF ELECTRICALLY HEATED DEVICES
AND ELECTRIC-RESISTANCE-HEATING ELEMENTS THEREFOR
Original Filed Sept. 18, 1940　　　　　　　　2 Sheets-Sheet 2
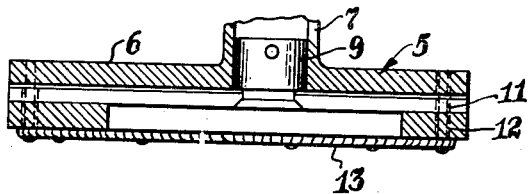
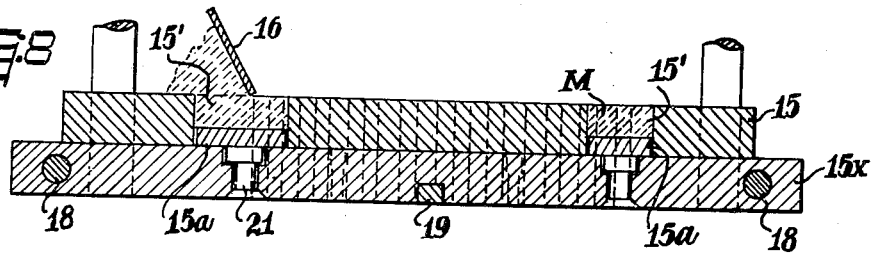
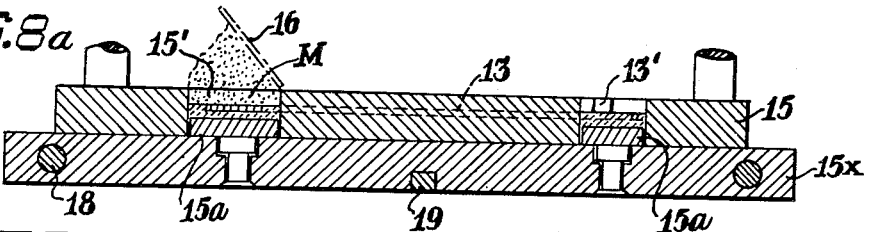
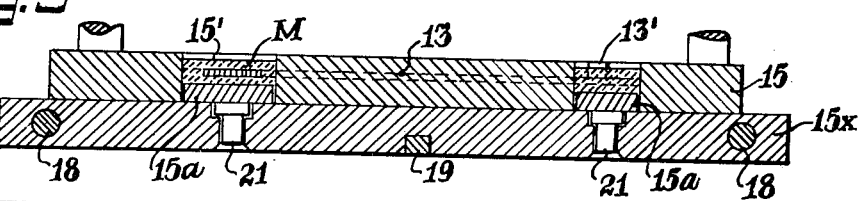
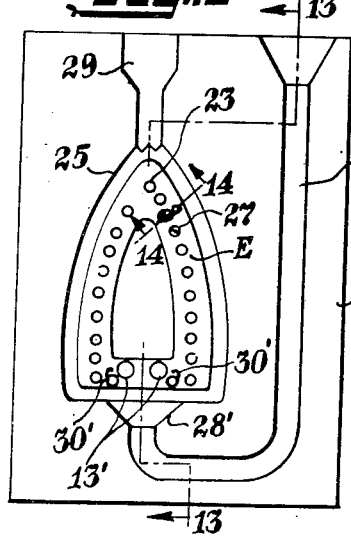
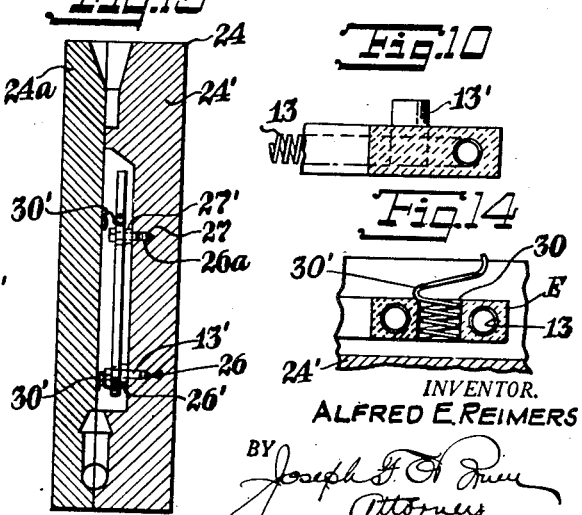
INVENTOR.
ALFRED E. REIMERS
BY Joseph F. R. [illegible]
　　Attorney Patented Apr. 26, 1949

2,468,409

UNITED STATES PATENT OFFICE 2,468,409

METHOD OF MANUFACTURE OF ELECTRICALLY HEATED DEVICES AND ELECTRIC-RESISTANCE HEATING ELEMENTS THEREFOR

Alfred E. Reimers, Harrington Park, N. J.

Original application September 18, 1940, Serial No. 357,264, now Patent No. 2,403,022, dated July 2, 1946. Divided and this application June 18, 1946, Serial No. 677,462

9 Claims. (Cl. 201—67)

This invention relates to improvements in methods of manufacture of electrically-heated devices having cast-in electrical-resistance elements, and particularly to methods of manufacture of such devices as sadirons, hot plates, cooking utensils and other types of electrical heating apparatus employing flat electric-resistance heating elements, and constitutes a division of my early application Serial No. 357,264, filed September 18, 1940, entitled Electrically heated devices, electric-resistance heating elements therefor and methods of manufacture thereof, and which has, during pendency of this application, matured into Patent No. 2,403,022, issued July 2, 1946.

Embedding electric heating resistors has long been found a reliable means of transmitting the developed heat to the working surfaces of the devices they are required to heat. Certain factors, however, limit the effectiveness of such embedding and embedded resistors. For example, where efficient design and moderate to heavy duty is required, the known electrical-insulating and heat-conducting materials are restricted to finely-divided or granular materials that are hard or refractory, friable and uncohesive though compactable, such as electrically-fused alumina, magnesium oxide, and zirconia. These materials possess relatively high heat conductivity and high electrical insulation at elevated temperatures.

Bonding agents such as selected clays were heretofore used to integrate the granular mass when it was used in some plastic condition about the heat producing coil. This method requires the "firing" of the material to mature or vitrify the bond. Such material with a clay bonding agent was in some cases plastered in grooves in an asbestos or porcelain core-holder. Since the presence of the bond itself limits the temperature at which the embedding material may operate, and as a compacting of such material increases its efficiency, heating-element constructions were used in which the material was compacted and no bond was employed, and to this end, such coil-embedding materials were compacted within reinforcing metal tubes and other jackets or containers. This process is expensive as it involves the forming of the costly metal tube or jacket to adapt it to the area and the surfaces of application.

Electrically-heated devices of the cast-in type hereinabove specified have also heretofore been manufactured by casting into the heated device an electric-resistance heating-element in which the aforesaid embedding material was thus reinforced by a metallic tubular member and it has also been proposed to employ cast-in heating elements in which a pastic embedding composition was molded and so set into a grooved reinforcing core-member of heat-insulating materials such as Portland cement, asbestos, soapstone, talc, quartz, etc. that only a minor part of the surface of the embedding material was exposed or in direct contact with the cast metal. In the latter case, the resultant heating element, because the reinforcing core was unduly thick and clumsy and the major portion of the surface of the coil-embedding material is, in the finished article, separated and insulated from the casting-in metal, thus preventing maximum heat transfer and distribution between the embedding material and the cast-metal and in the former case, the reinforcing tube separates the embedding material from the cast-metal and two bonds are required, one being a cold bond between the inner surface of the metal tube and the embedding material and the other being a metal to metal bond between the outer surface of the tube and the cast metal of the device or article. Also when a sheating-tube, filled with finely-divided refractory or friable material, is employed in the manufacture of a flat heater device or article, the tube usually must be bent into suitable shape to fit the mold in which it is to be cast; and to enable its use with light sections of casting metal, such bending or forming must be very accurate to provide definite and uniform location of the element within the device or article mold. Accurate and uniform shaping of such pieces is very difficult and in practice, this form of resistance-element is irregular in the cast pieces causing unequal heat-distribution and leaving exposed tube sections, which readily overheat and produce burn-outs. In all such cast-in heated devices or units having tubular metallic-sheathed elements, the initial thickness of the metal sheathing tube also necessarily adds to the thickness of metal between the resistance coils and the heat applying surface.

Such elements having external or core-reinforcements, furthermore, do not lend themselves to the provision therein of closely-related tie-forming holes that when the element is cast-in produce heat-distributing ties of cast-metal that assist in providing a unitary electrically-heated device in which all parts of the storing metal and the heat-applying surface will be uniformly and equally heated with a minimum expenditure of heating energy. Also prior art methods of making such articles and particularly for making relatively flat articles, required a relatively large number of essential parts and a rather involved number of operations to produce the electrically-heated device per se.

Heretofore, also, embedded electrical-resistance heating-elements for sadirons and the like that were adapted to be renewed when burned out were made without refractory frames or cores and without metallic sheathing members. The heating coils in such elements were embedded in a wet embedding material formed into a mortar, then set, and later reinforced by a hardened outer shell composed of the embedding material and water glass or silicate of sodium. These elements were made and sold under my Patent No. 1,439,121 as independent or separate articles of manufacture for insertion into a sad-iron base. In these elements the embedding material was not compressed, therefore necessarily made relatively thick and were adapted to be fitted closely into and to fill a depression in the body portion or base of a sad-iron. The resulting element was composed of an uncompressed mortar-set mass of friable, granular coil-embedding material bonded by a suitable fluxing or bonding agent, such as clay, encased in a hardened shell produced by the application of a coating of silicate of sodium or like material to the outer surface of the mass. This mortar-set mass of embedding material within the hardened shell is relatively fragile and the entire element has little resistance to crushing pressure, while the presence of the bonding agent limits the temperature at which the device may operate. Said wet method of molding was slow and cumbersome, permitted hidden voids and produced a relatively weak structure; also, said method made it difficult to produce elements accurately to the size and smoothness required for a satisfactory element to be cast into the base of a sad-iron or other electrically-heated device; also made it difficult ot procure accurate and uniform location of the resistors close to the outer surface of the embedding material. These and other factors make it undesirable to use such an element in a cast-in device where the element itself is permanent and not renewable. Furthermore, no one ever contemplated using such elements as a cast-in heating element and in fact my said uncored and unsheathed element does not possess the necessary properties and qualities to enable it to be successfully used as the heating element in a cast-in device or article and also for the reasons hereinabove specified does not lend itself to the provision of accurately-positioned and smooth tie-forming bores or holes extending through the body of the element.

While compressed embedding material reinforced by tubes has, as aforesaid, been used in cast-in devices or articles, I have heretofore found it to be impractical to cast-in sheathed or jacketed elements of flat or similar shape because the flat middle portions in the casting-in process buckle away from the embedding material and leave voids or spaces that prevent efficient heat transfer to the cast metal.

One of the objects of my invention is to provide methods of manufacture of cast-in electrical-resistance heating elements for electric stove heaters, flat irons and the like, that will possess the essential qualities of compactness and fast heating and to this end will avoid such excessive mass and bulk that would of itself prevent rapid heating, and instead provide an element that will possess minimum bulk combined with a maximum area of heat-transfer surface in direct contact with the heat-storing material, such as cast-iron of the device or article to be heated.

Another object of my invention is to produce methods of manufacture of unsheathed and uncored electric-resistance heating-elements formed of resistor coils embedded in said highly efficient resistance-coil-embedding material that will provide in the electrical-resistance heating-element the advantages of an extremely light proportion of bonding material, yet having adequate strength; the accurate location of the element and its coil to serve, as required, the body portions of the article to be heated, plus an intimate bond between the embedded unit and the article itself, and to accomplish this with lowest cost due to few parts and few operations.

Another object of my invention is to provide methods of manufacture of electric-resistance elements that will, in themselves, with a minimum of bulk, possess sufficient strength, rigidity and resistance to crushing pressure as to permit, without the use of reinforcing cores or metal sheathing members, a casting directly into an electrically-heated device or article.

Another object of my invention is to provide methods of manufacture of heating elements formed of heating coils and terminals embedded in said refractory and friable electrical-insulating and heat-conducting material so co-related and arranged as to eliminate the necessity for any reinforcing core or metal jacket, sheath or tube and to provide a body surface which will, in the casting operation enable the molten metal of the device or article to have an increased contact with the surface of the embedding material without the intervention of any insulating holding core or reinforcing metal sheath member and without any intervening or with negligible film or heat-impeding layer, and preferably will provide a contacting heat-transfer surface between the embedding material and cast metal which will extend substantially all around said embedding material.

Another object of my invention is to furnish a method of manufacture of an electrical-resistance element of the type hereinabove described embodying the aforesaid highly efficient uncontained, and unsheathed heat-conducting and electrical-insulating material which will definitely provide, in the finished article, for the desired heat distribution and for the accurate positioning of the coils, insulation and terminal pieces.

Another object of my invention is to provide a method of manufacture that will produce such accurate positioning and definite relationship by a series of simple operations which will cause uniformity in the finished product and will provide an element that will not, to any material degree, crack or crumble in the casting process under the heat and pressure of molten metal but which, on the contrary, will without any reinforcement, maintain its integrity and uniformity of shape during the casting operation, and furthermore, will, in the finished article, provide smooth uniform walls and surfaces that will enable uniform thickness of the walls of metal articles to be produced in casting.

Another object of my invention is to coat a compressed embedding material unit with a coating flux, such as phosphoric acid, water glass or one of a number of substances which will be suitable for the purpose of reinforcing said compressed mass of embedding material and that will produce a vitrified shell with a coefficient of expansion close to that of the embedding material.

Another object of my present invention is to provide methods of manufacture of an element in which the making of the coil-embedding heat-conducting and electrical-insulating material is accomplished by packing and compressing in suitable dies under high pressure in a press, the finely-divided refractory and otherwise friable electrical-insulating and heat-conducting material and after such compressing further strengthening the element of refractory or friable insulating material by impregnating the element with a flux of strengthening material so as to produce a body of embedding material encased in a vitrified reinforcing shell of minimum thickness and having a coefficient of expansion that will provide a proper bond between the surface of the element and the cast metal walls of the article into which it is cast.

Another object of my invention is to provide methods of manufacture of a resistance element formed of a compressed embedding material that will not only procure better and more uniform heat distribution in the element itself, but which will provide accurate and smooth surfaces which may be positioned much closer to the outer surface of the cast-metal article or device without danger of overheating, burn-outs or the like.

Another object of my invention is to provide methods of manufacture which eliminate the cold bond between the insulating material and metal sheathing of former units and substitute therefor, an intimate hot autogenous bond between the compressed refractory and friable insulating material and the liquid or molten cast-in metal in which all depressions and/or holes, large and small, in the contacting surface of the unit may be filled with the cast metal of the article.

Another object of my invention is to provide a new method of embedding the resistance coil or coils and compressing the finely-divided insulating material around the same which comprises first providing a suitable die, filling the same initially with insulating material preferably having a suitable temporary bond adapted to be eliminated in the subsequent firing, then compressing, preferably by a high pressure produced with a hydraulic press, the finely-divided material to about half the original thickness and simultaneously pressing into and embedding just below the top surface of the insulating material, a resistor coil and terminal; then secondarily filling the die above said compressed portion and secondarily compressing the secondary filling with the initial resistor-embedding body to provide a suitable thickness of compressed material surrounding the resistance coil or coils. The compressed unit thus produced will possess sufficient strength to enable releasing or ejecting from the die and moving the same for drying in a hot air chamber. The element is then further impregnated or coated on its outer surface with a strengthening material and then baked at high temperature whereupon the temporary bond is eliminated, the strengthening material is vitrified and the element is ready for the casting-in operation.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a hydraulic press and loading table adapted for use in compressing my bare or unsheathed electric-resistance heating elements;

Fig. 2 is a view in elevation of the press shown in Fig. 1;

Fig. 3 is a view in side elevation of a form or coil-mounting member for mounting a resistance coil suitable for use in an electrical-resistance heating-element for sadirons;

Fig. 4 is a view in plan from the bottom of the form or mounting member shown in Fig. 3;

Figs. 5 and 6 are plan and side elevation views of one of my bare electrical-resistance heating-elements in finished form after the compressing operation;

Fig. 7 is a longitudinal section, partly broken away of the form or coil-mounting member shown in Figs. 3 and 4;

Fig. 8 is a view in cross-section of a die suitable for use in the press shown in Fig. 1 and showing the cavity filled with insulating material and levelled off ready for embedding of a resistor coil and compressing said material;

Fig. 8a shows a similar view of the die and the position of the resistor coil, terminals and insulation after an initial pressing operation to embed the resistor coil;

Fig. 9 is another similar view showing the condition of the insulating material, die and embedded resisting element after a second filling and pressing operation;

Fig. 10 is a fragmentary section of a portion of a resistor coil, terminal and electric-insulating and heat-conducting material;

Fig. 11 is a fragmentary view in section similar to Fig. 9 showing a modified form of element having two resistor coils embedded in the embedding material;

Fig. 12 is an elevation of a mold employed by me with the face plate removed;

Fig. 13 is a vertical section on the line 13—13 of the mold shown in Fig. 12; and Fig. 14 is a section on the line 14—14 of Fig. 12, looking in the direction of the arrows.

Referring now to these drawings which illustrate a preferred embodiment of my invention, I first prepare a flat, bare or unsheathed electric resistance heating-element by completely embedding a resistor coil in compressed finely-divided electrical-insulating and heat-conducting material, exposing terminals of said coil and providing during the preparation a series of tie holes extending through said flat piece; and I then cast-in said electric-resistance heating-element within a suitable mold to produce the final electrically-heated device such as a sadiron base.

In accordance with my invention I provide element proportions affording compactness combined with efficiency of design that will be consistent with efficient performance. By efficiency of design is meant particularly two factors, 1: the proportion of bulk or mass of heating unit to that of the article to be heated; and 2: the locating closely to the surfaces (or parts to be heated) of the heating element. In this invention these factors are in turn largely dependent on permissible proportions of the heating element. It follows that efficient and practical design employing flat embedded elements, may be stated in terms of proportions of the heating element, as follows: When heater element thickness exceeds six per cent of the sum of the two major dimensions, i. e., length and breadth, or two diameters if round, it becomes impractical for most applications. On the other hand I find that a thickness ratio of from three to four per cent of that sum is entirely practical, effective in most designs, affords rapid heating and is efficient in use.

In accordance with my invention I also provide a heating element in which only a small proportion of bonding materials which would normally give a low degree of strength in the mass is employed and yet strength for handling and to stand the strains of the casting-in process are supplied. To this end, I coat the element after it is pressed an dried, with a flux which is preferably sprayed onto its surface. The element is then dried a second time and then fired. In firing, the flux and surface particles of the embedding mass vitrify, forming an extermely thin though strong outer shell having a minimum thickness amounting to about .010 inch.

I first proceed to manufacture such an electric heat resistance element by the use of the following apparatus and methods:

To procure compression and embedding of the resistor coil within the finely-divided electrical-insulating and heat-conducting material, I preferably employ a hydraulic press 1 of conventional type, having a loading table 2, a press head 3 and a bed plate 4 (see Fig. 2). A resistance-coil mounting-form 5 which, in Figs. 3 and 4 has the shape of a flat-iron base, is mounted on the head 3 of the press and consists, as shown, of a back or pin carrier plate 6 having a hollow shank member 7 projecting upwardly therefrom. A stripper plate 8 is loosely coupled with the pin carrier plate by means of the upwardly projecting stem 9 carrying the latch 10 which passes through an opening 7' in the top of the hollow shank 7 and latches over the top plate 7ª of the shank. These two plates are slightly spaced from each other though resiliently retained in aligned relationship to each other by the spring 7ᵇ which abuts at one end against the inner surface of the top plate 7ª and at the other end against the top of the stem 9. The plate 6 carries a series of projecting tapered pins 11 which pass through clearance holes 12 in the stripper plate 8 and project from the opposite surface of said stripper plate 8 a sufficient distance to enable the support on such pins of a helically-coiled wire resistance member 13. This wire resistance 13 is strung upon the projecting pins to abut the outer surface of the stripper plate 8 and the pins are so arranged in relation to the plates to enable the secure stringing and supporting of the helically-coiled resistance wire 13 by the spring tension of the coils and said resistor coil may be made to assume any suitable shape desired. In the embodiment shown in Figs. 3 and 4, the helically-coiled wire resistance member strung on the pins 11 is suitable for use as a resistor coil in an electric-resistance heating-element adapted to be cast-in within a sad-iron base. Obviously, the pins 11 are positioned and the resistance coil may be strung thereon to provide a resistor-coil for use in an electric-resistance heating-element adapted to be cast in many different shapes and capable of use in any flat electric-resistance heating-element for use in hot-plates, cooking utensils and other apparatus.

The mounting member 5 for the helically-coiled resistance wire is produced, as aforesaid, by the use of the plates 6 and 8 and is mounted beneath the head 3 of the press, the mounting in the embodiment shown being accomplished by passing the shank 7 upwardly through a suitable aperture in the head 3 and locking the same in position by the use of a spring-pressed latch 14 which engages in a notch 7ᶜ formed in a wall of the shank 7; and is adapted to cooperate with a die in the press 1 to compress a finely-divided electrical-insulating and heat-conducting material and embed the resistance-coil therein. Thus, a die 15 is mounted on a bed plate 4 and the plates so combined are placed upon the loading table 2. The die 15 comprises a die-base 15ˣ and a die 15 and is provided with a cavity 15', the depth of which is shown in cross-section in Fig. 8, the shape of said cavity being in the form of the article to be produced and, as shown, having the shape or form illustrated in Figs. 3 and 4. This cavity 15' is provided with a closely-fitting stripper member 15ª at the bottom thereof and is filled and overflowed with finely-divided or powdered coil-embedding material which preferably comprises a finely-divided refractory and otherwise friable electrical-insulating and heat-conducting material. The excess material is then struck off and levelled in any suitable way such as by the scraper plate 16, and the material in said cavity is subjected to a compression pressure under the power of the hydraulic press preferably to such an extent that the material M in the cavity 15' of the die 15 will be compressed to approximately three-eighths of its initial thickness. In the compressing operation, by the use of the handle 17 (Fig. 1), the filled die is moved from the loading table 2 on rails 18 guided by a center guide rail 19 onto the platen 20 of the press. The platen of the press is then raised by the hydraulic power of the press to produce a first press stroke and the resultant pressure causes the embedding of the resistance coil 13 in the material M, and the compression of the material in the die cavity. In this first stroke or operation, the pressure produced on the plate 8 of the form member 5 first takes up the slack or space between the plates 6 and 8 and compresses the spring 7ᵇ to free the head of the latch 10 from the top plate 7ª which allows a flat spring 7ᵈ, mounted in the hollow shank 7, to press the latch 10 out of locking engagement with the notch 7' in said top 7ª of the said shank and to hold in open position the said latch while said press pressure continues. When the first pressure stroke of the press is completed, the press-platen with the die 15, drops away from the form member 5. During this operation the coiled spring 7ᵇ forces the stripper plate 8 away from the pin mounting plate 6 and so presses down upon the partially formed electrical-resistance element as shown in Fig. 8ª, until the pins are withdrawn from the compressed embedding material surrounding the resistance coil and its terminal members 13'. The completion of the first pressure stroke thus leaves the resistance coils embedded in compressed material in the die cavity.

After completion of the first press stroke, as aforesaid, the die 15 and bed 4 are pulled away from the platen to the loading table 2 where the remaining unfilled portion of the die cavity is again filled with embedding material, as shown in Fig. 8ª and the excess struck off by a scraper plate. The form member 5 comprising plates 6 and 8 is then removed from the head 3 of the press and a finishing plate of a similar shape is placed on top of the material in the filled die cavity and die combination including the plates 4 and 15 are placed in position on the press platen and pressure is again applied in the same manner as hereinabove specified. Upon completion of this second stroke of the press, the die is again withdrawn after last pressing, on to the loading table, where suitable ejecting mechanism, operating through pins 21ᵃ, will engage the pins 21 of the combination die 15 and through a raising of such ejector pins 21 will force upwardly the loose bottom or stripper plate and the finished electric-resistance element will be ejected from the die cavity. The finishing plate may be removed at any suitable time and this ejection may be accomplished either before or after such removal.

Some element constructions require additional resistors, and in Fig. 11 I have shown a deeper form of die cavity of the type shown in Figs. 8, 8ᵃ and 9, adapted for embedding two resistors in my compressed embedding material. This form of my invention is produced by following the practice hereinabove described except that instead of compressing two layers of embedding material for a single resistor, three layers will be successively compressed. Thus, a second resistor 13ᵃ will be partially embedded in the surface of the second layer and a third layer of embedding material will be compressed above the same to finish the element. The terminals 13ᵃ′ of the upper coil will, of course, be of less height than of the lower coil and all the terminals of the two resistor coils will be so positioned as shown so as not to conflict with each other.

While I have hereinabove referred to resistor coils, it will be understood that I do not wish to limit myself specifically to the use of coils, as ribbon, strip or like resistors may, in accordance with my invention, be similarly inserted and embedded in compressed embedding material.

From the above, it will be seen that I have produced a compressed electric-resistance heating element having resistance coils properly embedded therein and I find that because of the heavy compression obtained by the use of the hydraulic press, the said element will have sufficient strength and rigidity to enable the same to be handled and subsequently to be mounted in a cast metal mold as hereinafter described, but in the preferred embodiment of my invention, I preferably either prepare the material with a suitable binder prior to compressing the same and/or I may, after pressing the same, treat the compression material with a suitable hardening and strengthening material.

In forming electric-resistance heating-elements for flat electrically heated devices which are adapted for use in the cast-in process hereinafter described, I preferably provide the form with a series of pins 22 which produce holes 23 in the finished electric-resistance element which holes have a tying function as hereinabove specified.

It will also be seen from the above that I provide an accurately die-outlined element with complete embedding, supporting and surrounding of the resistor coil by walls of accurately-measured thickness and that my method produces a uniform covering of the resistor coils with an electrical insulating and heat-conducting material, and also that I provide for the uniform and accurate location of the terminal members, and also provide in the element, accurate positioning of holes or other parts which are used as supporting means when the same is placed in a mold to receive the molten metal as hereinafter described.

It will be seen also that I have provided an electric-resistance element comprising a member in flat shape, which may be made of relatively thin depth or cross section, whereby the resistance coil may be distributed longitudinally as required or necessary in relation to the flat surface to be heated and still the said resistance coil may, in the finished article or device, be positioned close to the surface to be heated with a minimum mass of insulating material and a minimum mass of cast metal between such resistor and the said surface to be heated.

In producing an electrically-heated device such as a flat iron base, I provide a two-part mold 24 having a back member 24′ and a face or front member 24ᵃ so arranged and formed as to produce a suitable molding cavity 25 and pouring conduits therefor. I then mount in the molding cavity 25 of such mold, the bare or unsheathed electric resistance element E. It is desirable to mount and maintain said insulating element E in properly aligned position within the mold cavity and to provide mounting means that will align the same and prevent any shifting thereof in said mold cavity during the casting-in operation. With this end in view, as shown in Figs. 12 and 13, the lower part of one wall of the mold cavity and preferably lower part of the wall in the block member 24′, is provided with a pair of supporting apertures 26 into which the terminals 13′ at the lower end of the element are adapted to extend, an insulating spacing ring 26′ preferably being positioned on each of such terminals to suitably space the surface of the element E from the wall of the mold, and the upper part of the element is properly spaced and retained or supported in position on the same wall of the mold by providing an upper supporting aperture 26ᵃ, extending into said aperture a screw 27 suitably mounted in the element E and having a spacing washer 27′ cooperating therewith to space the upper part of the surface of the element from said wall of the mold. As shown, the screw 27 is secured in one of the upper tie holes 23 and projects outwardly beyond one side surface thereof, and this screw with the two terminals provide a three-point contact with one wall of the mold cavity. In order to prevent any shifting of the element E in the holes 26 and 26ᵃ, I project at the opposite side of the element E a plurality of resilient abutments 30′ adapted to contact with the opposite wall of the cavity in the face member 24ᵃ. As illustrated, these resilient abutments comprise extension portions of light springs 30 mounted in three tie-holes 23 at three points adjacent to the supporting holes 26, 26ᵃ so as to form, upon the closing of the molding, a three-point abutment or contact with the said opposite wall thereof and to cooperate with the screw 27 and terminals 13′ for the purpose of aligning the element upon the closing of the mold and preventing any shifting of such element after the mold is closed and during the subsequent handling and pouring operation. As illustrated, the body portions of three spiral springs 30 are mounted or seated in three holes in the element and each of these springs has an extension terminal portion 30′ projecting above the surface of the element on the side thereof opposite to the rigid projecting members 27 and 13′. When the cover 24ᵃ of the mold is applied over the cavity, these terminal portions 30′ contact with the inner wall or surface of the said member 24ᵃ and thus, in case the element has shifted outwardly in the mold holes 26, will press the same back into properly aligned relationship and will hold said element in proper position during the pouring operation. It will be understood that these springs, as well as the screw and spacing washers, will remain in the element and be embedded in the cast metal during the pouring operation. The figures illustrate a "dry sand" mold of conventional type, but it will be understood that the same arrangement may be used in a "green sand" mold provided that small dry sand plugs be made and set in the green sand at the terminals and at the screw or other third point so that the element might be properly supported in the mold cavity.

In the mold embodiment shown, the molten metal is poured through a conduit 28 connected at 28' with the bottom of the mold cavity so that the molten metal enters said mold cavity 25 through the bottom thereof and rises in a pool to completely surround the element and also to enter and fill the series of holes 23 therein. The molten metal rises, as aforesaid, and any dirt or impurities floating on the top surface of the molten pool and also expanded air or gas is driven out of the cavity through the riser conduit 29 which is connected at its lower end with the mold cavity and at its upper end is free to the atmosphere.

It will be seen, furthermore, that by providing a flat piece of material with holes extending through the same from side to side, I am enabled, in the molding operation when the cast metal flows through such holes, to form secure ties between thin, adjacent, flat walls formed in the cast metal, which thin walls might otherwise be too weak and expand away from the surface of the insulating element when the same is subjected, in operation, to high temperatures.

The shrinkage or contraction of the metal of the article about the element on cooling obviously causes a pressure to be exerted against the walls or surfaces of the element. This shrinkage pressure tightens the joint between such metal and the surface of the element so that a tightly contacted and shrink-on autogenous joint between the metal and embedding material provides for highly efficient heat transfer or conduction through such joint.

In casting-in an element such as hereinabove described, I have found that, after the element is mounted in the mold as hereinabove described, it is desirable to apply the molten metal to the element gradually and while the mold is positioned in upright position supported on one edge. I, therefore, as shown, position and support the mold in upright position on its bottom edge and pour through the channel or conduit 28 and 28' which extends vertically from the top edge to a point below the bottom of the mold cavity and communicates with said bottom of the mold cavity (within which the element is supported) at the bottom thereof so that the poured metal gradually rises in the cavity and surrounds the element therein. I find that this procedure enables the metal to enter all the tie-holes and cavities and to produce the tight joint hereinabove specified.

In certain types of electrically heated devices, and particularly in devices such as sadirons, where the heat is controlled by a thermostat and consequently a high degree of operating temperature is not required, I have found that, instead of coating or impregnating the compressed element with a strengthening material or flux and baking the same at a high temperature, it is possible to economize time and to reduce the cost of manufacture by adding to and mixing with the embedding material, prior to the compressing step, a relatively small quantity of a suitable "frit" or flux, such as pulverized glass, then compressing the embedding material in the manner hereinabove specified to produce an element and thereafter, before the casting-in operation, baking the elements at a relatively low temperature to cause the "frit" to be vitrified and the mass of embedding material to be bonded.

Having described my invention, I claim:

1. The method of manufacturing electrically-heated devices which consists in compressing in a die, a body of friable, uncohesive electrical-insulating and heat-conducting embedding material and simultaneously embedding therein a resistor coil, releasing said compressed body from the die to initially produce a die-formed compressed heating element having the major portion of its surface composed of such friable, uncohesive embedding material, then mounting said element in a mold cavity having the shape of the finished article, and pouring metal into the mold to cast-in said element and contact directly with said embedding material, and releasing said cast-metal device from the mold.

2. The method of manufacturing electrically-heated devices which consists in compressing in a die, a body of friable, uncohesive electrical-insulating and heat-conducting embedding material and simultaneously embedding therein a resistor coil, releasing said compressed body from the die to initially produce a die-formed compressed heating element having the major portion of its surface composed of such friable, uncohesive embedding material, applying to the said body a flux, vitrifying said flux by application to said element of heat, then mounting said element in a mold having the shape of the finished article, and pouring metal into the mold to cast-in said element and contact directly with said embededing material, and releasing said cast-metal device from the mold.

3. The method of manufacturing electrically-heated devices which consists in compressing in a die, a body of friable, uncohesive electrical-insulating and heat-conducting embedding material and simultaneously embedding therein a resistor coil, releasing said compressed body from the die to initially produce a die-formed compressed heating element having the major portion of its surface composed of such friable, uncohesive embedding material, applying to the surface layer of said body a thin coat of a flux, vitrifying said surface layer by application of heat, then mounting said element in a mold having the shape of the finished article, and pouring metal into the mold to cast-in said element and contact directly with said embedding material, and releasing said cast-metal device from the mold.

4. The method of manufacturing electrically-heated devices which consists in packing and compressing in a suitable die under high pressure in a press, a body of finely-divided embedding material of friable character, releasing said compressed body from the die, further strengthening the said body of embedding material by impregnating the surface thereof with a strengthening material flux having a coefficient of expansion under heat substantially similar to that of the embedding material to produce a body of embedding material encased in a vitrified reinforcing shell of minimum thickness and then pouring cast metal and producing a proper bond between the surface of the element and the cast metal walls of the article into which it is cast.

5. The method of manufacturing electrically-heated devices which consists in compressing in a die, a body of friable, uncohesive electrical-insulating and heat-conducting embedding material and simultaneously embedding therein a resistor coil to initially produce a die-formed compressed heating element having the major portion of its surface composed of such embedding material, releasing said compressed heating element from the die, then mounting said element in a mold cavity having the shape of the finished article, supporting said mold to cause the element within the mold cavity to be supported therein and to extend in a substantially vertical plane, pouring metal into said mold cavity through an edge thereof into direct contact with said element, and subsequently releasing said cast-metal device from the mold.

6. The method of manufacturing electrically-heated devices which consists in compressing in a die, a body of friable, uncohesive electrical-insulating and heat-conducting embedding material and simultaneously embedding therein a resistor coil to initially produce a die-formed compressed heating element having the major portion of its surface composed of such embedding material, releasing said compressed heating element from the die, providing said element with rigid projections at one side and resilient projections at the opposite side, providing a two-part mold having a molding cavity of the shape of the device to be produced, forming element-supporting holes in one wall of the said mold cavity in one of said two mold-parts, projecting said rigid mounting porjections into such holes, closing the other part of said mold against said resilient projections, supporting the mold to extend the cavity in a substantially vertical plane, pouring metal into said mold cavity through an edge thereof into direct contact with said element, and subsequently releasing said cast-metal device from the mold.

7. The method of manufacturing electrical resistance heating elements for electrically heated devices which consists in supplying to a die-cavity a mass of finely-divided refractory friable, uncohesive electrical-insulating and heat-conducting embedding material, embedding therein a resistor coil, compressing under heavy pressure in said die-cavity said mass to approximately three-eighths of its initial thickness to produce a die-formed compressed body, releasing said compressed body from said die-cavity, thereafter applying to said compressed body a vitrifiable flux, and applying heat to said body to vitrify said flux to further strengthen said compressed body and produce an electrical-resistance heating element capable of withstanding pressure of casting metal about the same.

8. The method of manufacturing electrical resistance heating elements for electrically heated devices which consists in supplying to a die-cavity a mass of finely-divided refractory and friable, uncohesive electrical-insulating and heat-conducting embedding material, embedding therein a resistor coil, compressing under heavy pressure in said die-cavity said mass to approximately three-eighths of its initial thickness to produce a die-formed compressed body, simultaneously forming in said body during said compressing operation tie-holes passing through said compressed body to the opposite surfaces thereof, releasing said compressed body from said die-cavity, thereafter applying to said compressed body a vitrifiable flux, and applying heat to said body to vitrify said flux to further strengthen said compressed body and produce an electrical-resistance heating element capable of withstanding pressure of casting metal about the same.

9. The method of manufacturing electrical resistance heating elements for electrically heated devices which consists in supplying to a die-cavity a mass of finely-divided refractory and friable, uncohesive electrical-insulating and heat-conducting embedding material, embedding therein a resistor coil, compressing under heavy pressure in said die-cavity said mass to approximately three-eighths of its initial thickness to produce a die-formed compressed body, simultaneously forming in said body during said compressing operation tie-holes passing through said compressed body to the opposite surfaces thereof, releasing said compressed body from said die-cavity, thereafter applying to said compressed body a vitrifiable flux, and applying heat to said body to vitrify said flux to further strengthen said compressed body and produce an electrical-resistance heating element capable of withstanding pressure of casting metal about the same, mounting said element in a mold having the shape of the finished article and casting metal in a shell around said compressed body and filling said tie-holes to provide integral tie portions of said cast metal connecting opposite portions of the shell of cast metal.

ALFRED E. REIMERS.

REFERENCES CITED

The following references are of record in the file of this patent:

UNITED STATES PATENTS

| Number | Name | Date |
| --- | --- | --- |
| 522,718 | Leonard | July 10, 1894 |
| 877,843 | Hoskin | Jan. 28, 1908 |
| 1,312,657 | Wiegand | Aug. 12, 1919 |
| 1,398,410 | Wiegand | Nov. 29, 1921 |